United States Patent Office 3,649,637
Patented Mar. 14, 1972

3,649,637
SUBSTITUTED 5-(ORTHO CARBOXANILIDO-PHENOXYMETHYL)TETRAZOLES
John Gordon Bernard Howes, Hertford, and Rupert Aleck Selway, Harlow, Essex, England, assignors to T. J. Smith & Nephew Limited, Kingston-upon-Hull, England
No Drawing. Filed Nov. 4, 1968, Ser. No. 773,306
Claims priority, application Great Britain, Nov. 3, 1967, 50,066/67
Int. Cl. A61k 27/00; C07d 55/56
U.S. Cl. 260—308 D    4 Claims

ABSTRACT OF THE DISCLOSURE

Substituted tetrazoles which are useful for the treatment of inflammatory disorders in mammals are provided having the general formula

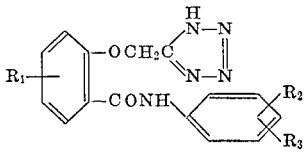

in which $R_1$, $R_2$ and $R_3$ each represent hydrogen, alkyl containing up to six carbon atoms, alkoxy containing up to six carbon atoms, halogen or trifluoromethyl.

Processes for the preparation of the substituted tetrazoles are also provided together with intermediates for use in their preparation.

This invention relates to substituted tetrazoles and to processes for their preparation.

According to the invention substituted tetrazoles are provided having the general formula:

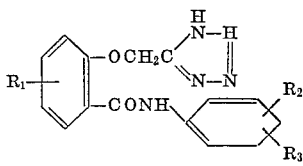

in which $R_1$, $R_2$ and $R_3$ each represent hydrogen, alkyl containing up to six carbon atoms, alkoxy containing up to six carbon atoms, halogen or trifluoromethyl.

The invention includes a process for the preparation of the compounds of general Formula I by reacting a substituted carboxanilido phenoxyacetonitrile having the general formula:

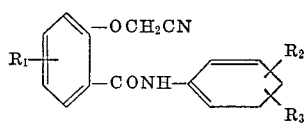

wherein $R_1$, $R_2$ and $R_3$ have the meanings given above with an azide such as for example ammonium azide.

The phenoxyacetonitriles of Formula II, which are novel compounds, may be prepared for example by the reaction of chloroacetonitrile with a substituted salicylanilide having the general formula:

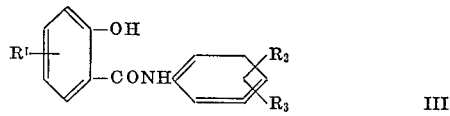

in the presence of an alkali metal carbonate, hydroxide or alkoxide.

The invention also includes a process for the preparation of the compounds of general Formula I by the reaction of a tetrazolo (5,1-c)2,3,4,5-tetrahydro-1,4-benzoxazepin-5-one having the general formula:

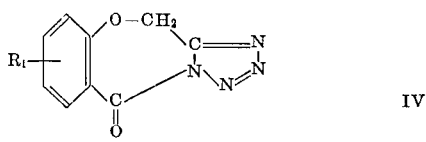

with an aniline of the general formula

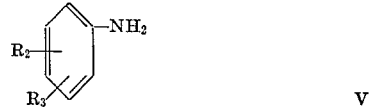

wherein $R_1$, $R_2$ and $R_3$ have the meanings given above.

The tetrazolo (5,1-c)2,3,4,5-tetrahydro-1,4-benzoxazepin-5-ones of Formula IV, which are novel compounds, may be prepared by the treatment of 5-(2-carboxy-phenoxymethyl)-tetrazoles of general formula:

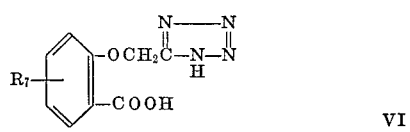

with a dehydrating agent such as for example thionyl chloride. The 5-(2-carboxyphenoxymethyl)-tetrazoles of Formula VI, which are novel compounds, may be prepared for example by the hydrolysis of compounds of the general Formula I.

The compounds of general Formula I are analgesic and anti-inflammatory agents and are useful for the treatment of inflammatory disorders such as for example rheumatoid arthritis and other painful conditions associated with inflammation.

The invention is further described in the following examples which are purely illustrative.

EXAMPLE I

5-[2-(4-methylphenylcarbamoyl)-4-chlorophenoxymethyl]-tetrazole 2-(4-methylphenylcarbamoyl-4-chlorophenoxy acetonitrile (see Preparation I below) (8.00 grams:0.0266 mole), sodium azide (2.02 g.; 0.031 mole) and ammonium chloride (1.68 g.; 0.031 mole) were added to N,N-dimethylformamide (40 ml.) and heated with stirring on a steam bath for 18 hours. The solvent was removed under reduced pressure, and the residual oil dissolved in ammonium hydroxide (150 ml.; 1.5 N). The solution was extracted three times with ethyl acetate before acidifying to pH 2 with dilute hydrochloric acid. The precipitated product was filtered, washed with water and dried to give material M.P. 178–179° C. (7.76 g.; 85%).

Recrystallisation from N,N-dimethylformamide:water (1:2 v./v.) gave the tetrazole as white needles M.P. 191–192° C.

$C_{16}H_{14}ClN_5O_2$.—Requires (percent): C, 55.90; H, 4.10; N, 20.37. Found (percent): C, 55.96; H, 4.11; N, 20.11.

The following compounds were prepared from appropriately substituted intermediates by a method similar to Example I.

EXAMPLE II

5-[2-(4-chlorophenylcarbamoyl)-4-chlorophenoxymethyl]-tetrazole

White needles from N,N - dimethylformamide:water (1:2 v./v.) M.P. 187–188° C.

$C_{15}H_{11}Cl_2N_5O_2$.—Requires (percent): C, 49.46; H, 3.04; N, 19.23. Found (percent): C, 49.60; H, 3.12; N, 18.95.

EXAMPLE III

5-[2-(3,4-dichlorophenylcarbamoyl)-phenoxymethyl]-tetrazole

White needles from N,N-dimethylformamide:water (1:2 v./v.) M.P. 196–197° C.

$C_{15}H_{11}Cl_2N_5O_2$.—Requires (percent): C, 49.46; H, 3.04; N, 19.23. Found (percent): C, 49.28; H, 2.99; N, 19.40.

EXAMPLE IV

5-[(2-phenylcarbamoyl)-phenoxymethyl]-tetrazole

White rods from N,N-dimethylformamide:water (1:2 v./v.) M.P. 167–168° C.

$C_{15}H_{13}N_5O_2$.—Found (percent): C, 61.14; H, 4.31; N, 23.82. Requires (percent): C, 61.01; H, 4.44; N, 23.72.

EXAMPLE V

5-[2-(3-trifluoromethylphenyl carbamoyl)-phenoxymethyl]-tetrazole

White micro crystals from acetone:water (1:2 v./v.) M.P. 182–183° C.

$C_{16}H_{12}F_3N_5O_2$.—Found (percent): C, 52.83; H, 3.13; N, 18.99. Requires (percent): C, 52.89; H, 3.33; N, 19.28.

EXAMPLE VI

5-[2-(4-chlorophenylcarbamoyl)-phenoxymethyl]-tetrazole

White micro crystals from acetone:water (1:2 v./v.) M.P. 213–214° C.

$C_{15}H_{12}ClN_5O_2$.—Found (percent): C, 54.88; H, 3.62; N, 20.99. Requires (percent): C, 54.63; H, 3.67; N, 21.24.

EXAMPLE VII

5-[2-(4-methoxyphenylcarbamoyl)-phenoxymethyl]-tetrazole

White needles from acetone:water (1:2 v./v.) M.P. 172–173° C.

$C_{16}H_{15}N_5O_3$.—Found (percent): C, 59.34; H, 4.45; N, 21.72. Requires (percent): C, 59.07; H, 4.65; N, 21.53.

EXAMPLE VIII

5-[2-(3,4-dichlorophenylcarbamoyl)-4-chlorophenoxymethyl]-tetrazole

White crystalline solid from N,N-dimethylformamide:water (1:2 v./v.) M.P. 220–223° C.

$C_{15}H_{10}Cl_3N_5O_2$.—Found (percent): C, 45.29; H, 2.45; N, 17.39. Requires (percent): C, 45.19; H, 2.53; N, 17.57.

EXAMPLE IX

5-[2-(4-methoxyphenylcarbamoyl)-4-chlorophenoxymethyl]-tetrazole

White crystalline solid from N,N-dimethylformamide:water (1:2 v./v.) M.P. 185–186° C.

$C_{16}H_{14}ClN_5O_3$.—Found (percent): C, 53.16; H, 3.87; N, 19.36. Requires (percent): C, 53.41; H, 3.92; N, 19.47.

EXAMPLE X

5-[2-(3,4-dichlorophenylcarbamoyl)-4-methylphenoxymethyl]-tetrazole

White micro needles from acetone:water (1:2 v./v.) M.P. 212–213° C.

$C_{16}H_{13}Cl_2N_5O_2$.—Found (percent): C, 50.51; H, 3.38; N, 18.74. Requires (percent): C, 50.81; H, 3.46; N, 18.52.

EXAMPLE XI

5-[2-(3-trifluoromethylphenylcarbamoyl)-4-methylphenoxylmethyl]-tetrazole

White micro crystals from N,N-dimethylformamide:water (1:2 v./v.) M.P. 188–189° C.

$C_{17}H_{14}F_3N_5O_2$.—Found (percent): C, 54.29; H, 3.99; N, 18.30. Requires (percent): C, 54.11; H, 3.74; N, 18.56.

EXAMPLE XII

5-[2-(3-trifluoromethylphenylcarbamoyl)-4-chlorophenoxymethyl]-tetrazole

White micro needles from acetone:water (1:2 v./v.) M.P. 212–213° C.

$C_{16}H_{11}ClF_3N_5O_2$.—Found (percent): C, 48.04; H, 2.56; N, 17.74. Requires (percent): C, 48.31; H, 2.79; N, 17.61.

EXAMPLE XIII

5-[2-(3,4-dichlorophenylcarbamoyl)-5-methoxyphenoxymethyl]-tetrazole

White micro needles from acetone:water (1:2 v./v.) M.P. 199–200° C.

$C_{16}H_{13}Cl_2N_5O_3$.—Found (percent): C, 49.00; H, 3.54; N, 17.60. Requires (percent): C, 47.74; H, 3.32; N, 17.77.

EXAMPLE XIV 5-(2-(phenylcarbamoyl)-4-chlorophenoxymethyl)-tetrazole

White micro crystals from acetone:water (1:2 v./v.) M.P. 188–189° C., $C_{15}H_{12}ClN_5O_2$.—Found (percent): C, 54.38; H, 3.81; N, 21.03. Requires (percent): C, 54.63; H, 3.66; N, 21.24.

EXAMPLE XV 5-(2-(phenylcarbamyl)-4-methylphenoxymethyl)-tetrazole

White micro crystals from acetone:water (1:2 v./v.) M.P. 170–171° C.

$C_{16}H_{15}N_5O_2$.—Found (percent): C, 62.03; H, 4.81; N, 23.00. Requires (percent): C, 62.12; H, 4.89; N, 22.64.

EXAMPLE XVI 5-(2-(3,4-dichlorophenylcarbamoyl)-4-ethylphenoxymethyl)-tetrazole White micro crystals from N,N-dimethyl formamide:water (1:2 v./v.) M.P. 212–213° C.

$C_{17}H_{15}Cl_2N_5O_2$.—Found (percent): C, 51.78; H, 3.70; N, 18.12. Requires (percent): C, 52.05; H, 3.85; N, 17.86.

EXAMPLE XVII 5-(2-(4-chlorophenylcarbamoyl)-4-methylphenoxymethyl)-tetrazole White micro crystals from acetone:water (1:2 v./v.) M.P. 193–194° C.

$C_{16}H_{14}ClN_5O_2$.—Found (percent): C, 55.63; H, 4.07; N, 20.22. Requires (percent): C, 55.90; H, 4.11; N, 20.37.

EXAMPLE XVIII 5-(2-(3-trichloromethylphenylcarbamoyl)-4-bromophenoxymethyl)-tetrazole White needles from glacial acetic acid M.P. 221–222° C.

$C_{16}H_{11}BrF_3N_5O_2$.—Found (percent): C, 43.33; H, 2.48; N, 16.10. Requires (percent): C, 43.46; H, 2.51; N, 15.84.

EXAMPLE XIX 5-(2-(phenylcarbamoyl)-4-bromophenoxymethyl)-tetrazole

White needles from glacial acetic acid:water (5:1 v./v.) M.P. 173–174° C.

$C_{15}H_{12}BrN_5O_2$.—Found (percent): C, 48.02; H, 3.19; N, 18.98. Requires (percent): C, 48.14; H, 3.23; N, 18.72.

EXAMPLE XX 5-(2-(3,5-dichlorophenylcarbamoyl)-phenoxymethyl)-tetarazole

Tetrazolo (5,1-c)2,3,4,5 - tetrahydro-1,4-benzoxazepin-5-one (10.00 g.; 0.0495 mole) was suspended in xylene (100 ml.) and warmed with stirring to 55° C. 3,5-dichloroaniline (8.16 g.; 0.0504 mole) was added in one go and the temperature raised to 100° C. and maintained for 2 hours. The solvent was removed under vacuum to leave a brown solid which was washed well with dilute hydrochloric acid, water, and dried to give material M.P. 213–214° C. (14.18 g.; 80%). Crystallisation from acetone:water (1:2 v./v.) gave the tetrazole as white needles M.P. 220–221° C.

$C_{15}H_{11}Cl_2N_5O_2$.—Found (percent): C, 49.47; H, 3.05; N, 19.23. Requires (percent): C, 49.35; H, 3.28; N, 19.42.

The following compounds were prepared from appropriately substituted intermediates by a method similar to Example XX.

EXAMPLE XXI 5-(2-(3,5-dichlorophenylcarbamoyl)-4-(chlorophenoxymethyl)-tetrazole White crystalline solid from acetone:water (1:2 v./v.) M.P. 226–227° C.

$C_{15}H_{10}Cl_3N_5O_2$.—Found (percent): C, 45.29; H, 2.45; N, 17.39. Requires (percent): C, 45.19; H, 2.52; N, 17.57.

EXAMPLE XXII 5-(2-(3-trichloromethylphenylcarbamoyl)-5-(methoxyphenoxymethyl)

Needles from acetone:water (2:1 v./v.) M.P. 218–220° C.

$C_{17}H_{14}F_3N_5O_3$.—Found (percent): C, 51.83; H, 3.59; N, 17.59. Requires (percent): C, 51.91; H, 3.59; N, 17.80.

Other compounds which have been described above in Examples V, VI, VIII, X and XII and which have been prepared by the method of Example XX are:

EXAMPLE XXIII (For the compound of Example V)

5-(2-(3-trichloromethylphenylcarbamoyl)-phenoxymethyl)-tetrazole

White micro crystals from acetone:water (1:2 v./v.) M.P. 182–183° C. The yield was 78%.

EXAMPLE XXIV (For the compound of Example VI)

5-(2-(4-chlorophenylcarbamoyl)-phenoxymethyl)-tetrazole

White micro crystals from acetone:water (1:2 v./v.) M.P. 213–214° C. The yield was 90%.

EXAMPLE XXV (For the compound of Example VIII)

5-(2-(3,4-dichlorophenylcarbamoyl)-4-chlorophenoxymethyl)-tetrazole

White crystalline solid from acetone:water (1:2 v./v.) M.P. 220–223° C. The yield was 91%.

EXAMPLE XXVI (For the compound of Example X)

5-(2-(3,4-dichlorophenylcarbamoyl)-4-methylphenoxymethyl)-tetrazole

White micro needles from acetone:water (1:2 v./v.) The yield was 99% and the melting point 209–211° C.

EXAMPLE XXVII (For the compound of Example XII)

5-(2-3-trichloromethylphenylcarbamoyl)-4-chlorophenoxymethyl)-tetrazole

White micro needles from acetone:water (1:2 v./v.) The yield was 86% and the melting point 210–211° C.

The preparations of the intermediates, which have not previously been described in the literature, are given below.

PREPARATION 1

2-(4-methylphenylcarbamoyl)-4-chlorophenoxyacetonitrile 5-chloro-p-salicylotoluidide (H. W. Hirwe, G. V. Jadhav and D. R. Suktankar, J. Indian Chem. Soc. 16, 281–284 (1939)) (8.24 g.; 0.315 mole), chloro-acetonitrile (3.40 g.; 0.45 mole) and anhydrous potassium carbonate (4.40 g.; 0.316 mole) were added to acetone (80 ml.) and the mixture stirred and refluxed for 20 hours. The mixture was cooled and poured into dilute sodium hydroxide solution (500 ml.; 1.0N). The precipitated product was filtered, washed with water and dried to give material M.P. 127–128° C. (9.14 g.; 96%).

Recrystallisation from actone:water (1:1 v./v.) gave the nitrile as a white crystalline solid M.P. 142–143° C.

$C_{16}H_{13}ClN_2O_2$.—Found (percent): C, 64.06; H, 4.26; N, 9.32. Requires (percent): C, 63.90; H, 4.36; N, 9.32.

The following compounds were prepared from appropriately substituted intermediates by a similar method.

PREPARATION 2

2-(4-chlorophenylcarbamoyl)-4-chlorophenoxyacetonitrile

White micro crystalline solid from acetone:water (1:1 v./v.) M.P. 140–141° C.

$C_{15}H_{10}Cl_2N_2O_2$.—Found (percent): C, 53.36; H, 3.15; N, 8.99. Requires (percent): C, 56.09; H, 3.14; N, 8.72.

PREPARATION 3

2-(3,4-dichlorophenylcarbamoyl)-phenoxyacetonitrile

White micro needles from acetone:water (1:1 v./v.) M.P. 146–147° C.

$C_{15}H_{10}Cl_2N_2O_2$.—Found (percent): C, 56.24; H, 3.27; N, 8.93. Requires (percent): C, 56.09; H, 3.14; N, 8.72.

PREPARATION 4

2-phenylcarbamoyl-phenoxyacetonitrile

White needles from ethanol:60/80 petroleum ether (1:1 v./v.) M.P. 155–156° C.

$C_{15}H_{12}N_2O_2$.—Found (percent): C, 71.61; H, 4.72; N, 10.93. Requires (percent): C, 71.41; H, 4.80; N, 11.11.

PREPARATION 5

2-(3-trifluoromethylphenylcarbamoyl)-phenoxyacetonitrile

White micro needles from acetone:water (1:1 v./v.) M.P. 131–132° C.

$C_{16}H_{11}F_3N_2O_2$.—Found (percent): C, 60.30; H, 3.71; N, 8.94. Requires (percent): C, 60.00; N, 3.46; N, 8.75.

PREPARATION 6

2-(4-chlorophenylcarbamoyl)-phenoxyacetonitrile

White needles from acetone:water (1:1 v./v.) M.P. 118–119° C.

$C_{15}H_{11}ClN_2O_2$.—Found (percent): C, 62.53; H, 4.03; N, 9.81. Requires (percent): C, 62.83; H, 3.98; N, 9.77.

PREPARATION 7

2-(4-methoxyphenylcarbamoyl)-phenoxyacetonitrile

White crystalline solid from acetone:water (1:1 v./v.) M.P. 100–101° C.

$C_{16}H_{14}N_2O_3$.—Found (percent): C, 67.96; H, 4.84; N, 10.13. Requires (percent): C, 68.07; H, 5.00; N, 9.92.

PREPARATION 8

2-(3,4-dichlorophenylcarbamoyl)-4-chlorophenoxyacetonitrile

White needles from acetone:water (1:1 v./v.) M.P. 153–154° C.

$C_{15}H_9Cl_3N_2O_2$.—Found (percent): C, 50.55; H, 2.58; N, 7.88. Requires (percent): C, 50.66; H, 2.55; N, 7.88.

PREPARATION 9

2-(4-methoxyphenylcarbamoyl)-4-chlorophenoxyacetonitrile

White needles from actone:water (1:1 v./v.) M.P. 107–108° C.

$C_{16}H_{13}ClN_2O_3$.—Found (percent): C, 60.88; H, 3.85; N, 8.81. Requires (percent): C, 60.67; H, 4.14; N, 8.85.

PREPARATION 10

2-(3,4-dichlorophenylcarbamboyl)-4-methylphenoxyacetonitrile

White needles from ethylalcohol:60/80 petroleum ether (1:1 v./v.) M.P. 141–142° C.

$C_{16}H_{12}Cl_2N_2O_2$.—Found (percent): C, 57.62; H, 3.61; N, 8.66. Requires (percent): C, 57.22; H, 3.61; N, 8.36.

PREPARATION 11

1-(3-trichloromethylphenylcarbamoyl)-4-methylphenoxyacetonitrile

White crystalline solid from acetone:water (1:1 v./v.) M.P. 129–130° C.

$C_{17}H_{13}F_3N_2O_2$.—Found (percent: C, 61.22; H, 3.85; N, 8.51. Requires (percent): C, 61.08; H, 3.92; N, 8.38.

PREPARATION 12

2-(3-trifluoromethylphenylcarbamoyl)-4-chlorophenoxyacetonitrile

White feathers from acetone:water (1:1 v./v.) M.P. 127–128° C.

$C_{16}H_{10}ClF_3N_2O_2$.—Found (percent): C, 54.14; H. 2.57; N, 8.15. Requires (percent): C, 54.17; H, 2.84; N, 7.90.

PREPARATION 13

2-(3,4-dichlorophenylcarbamoyl)-5-methoxyphenoxyacetonitrile

White rods from acetone:water (1:1 v./v.) M.P. 161–162° C.

$C_{16}H_{12}Cl_2N_2O_3$.—Found (percent): C, 54.52; H, 3.67; N, 8.14. Requires (percent): C, 54.72; H, 3.44; N, 7.98.

PREPARATION 14

2-(phenylcarbamoyl)-4-chlorophenoxyacetonitrile

White needles from acetone:water (1:1 v./v.) M.P. 116–117° C.

$C_{15}H_{11}ClN_2O_2$.—Found (percent): C, 62.53; H, 3.91; N, 9.93. Requires (percent): C, 62.83; H, 3.87; N, 9.77.

PREPARATION 15

2-(phenylcarbamoyl)-4-methylphenoxyacetonitrile

White crystalline solid from acetone:water (1:1 v./v.) M.P. 182–183° C.

$C_{16}H_{14}N_2O_2$.—Found (percent): C, 72.17; H, 5.25; N, 10.57. Requires (percent): C, 72.16; H, 5.30; N, 10.52.

PREPARATION 16

2-(3,4-dichlorophenylcarbamoyl)-4-ethylphenoxyacetonitrile

White needles from iso-propyl alcohol M.P. 138–140° C.

$C_{17}H_{14}Cl_2H_2O_2$.—Found (percent): C, 58.09; H, 3.84; N, 8.14. Requires (percent): C, 58.47; H, 4.04; N, 8.02.

PREPARATION 17

2-(4-chlorophenylcarbamoyl)-4-ethylphenoxyacetonitrile

White needles from acetone:water (1:1 v./v.) M.P. 133–134° C.

$C_{16}H_{13}ClN_2O_2$.—Found (percent): C, 63.79; H, 4.23; N, 9.50. Requires (percent): C, 63.89; H, 4.36; N, 9.32.

PREPARATION 18

2-(3-trifluoromethylphenylcarbamoyl)-4-bromophenoxyacetonitrile

White needles from glacial acetic acid:water (2:1 v./v.) M.P. 143–144° C.

$C_{16}H_{10}BrF_3N_2O_2$.—Found (percent): C, 47.89; H, 2.75; N, 7.37. Requires (percent): C, 48.13; N, 2.53; N, 7.02.

PREPARATION 19

2-(phenylcarbamoyl)-4-bromophenoxyacetonitrile

White needles from glacial acetic acid M.P. 133–134° C.

$C_{15}H_{11}BrN_2O_2$.—Found (percent): C, 54.51; H, 3.43; N, 8.61. Requires (percent): C, 54.40; H, 3.35; N, 8.46.

PREPARATION 20

(This intermediate was used in Examples XX, XXIII, and XXIV)

Tetrazolo-(5,1-c)2,3,4,5-tetrahydro-1,4-benzoxazepin-5-one

5 - (2 - carboxyphenoxymethyl) - tetrazole (44 g.; 0.20 mole) was treated with thionyl chloride (82 g.; 0.69 mole) in the cold containing 2 drops of N,N-dimethyl formamide. After 1 hour the mixture was slowly warmed to reflux and maintained at this temperature for 2 hours. The excess thionyl chloride was removed to give a brown solid (31.2 g.; 78%). M.P. 128–133° C. decomp. Crystallisation from benzene gave material of M.P. 135–136° C. decomp.

$C_9H_6N_4O_2$.—Found (percent): C, 53.16; H, 2.94; N, 27.54. Requires (percent): C, 53.46; H, 2.99; N, 27.72.

The following compounds were prepared from the appropriately substituted intermediates by a similar method:

PREPARATION 21

(This intermediate was used in Examples XXI, XXV and XXVII)

7-chloro-tetrazolo-(5,1-c)2,3,4,5-tetrahydro-1,4-benzoxazepin-5-one

White needles from acetone M.P. 191–192° C. $C_9H_5ClN_4O_2$.—Found (percent): C, 45.91; H, 2.35; N, 23.88. Requires (percent): C, 45.68; H, 2.13; N, 23.68.

PREPARATION 22

(This intermediate was used in Example XXVI)

7-methyl-tetrazolo-(5,1-c)2,3,4,5-tetrahydro-1,4-benzoxazepin-5-one

Colourless rods from acetone M.P. 174–175° C. $C_{10}H_8N_4O_2$.—Found (percent): C, 55.82; H, 3.85; N, 25.74. Requires (percent): C, 55.55; H, 3.73; N, 25.92.

PREPARATION 23

(This intermediate was used in Example XXII)

8-methoxy-tetrazolo-(5,1-c)2,3,4,5-tetrahydro-1,4-benzoxazepin-5-one

Pale yellow needles from benzene M.P. 186–187° C. $C_{10}H_8N_4O_3$.—Found (percent): 51.77; H, 3.53; N, 24.28. Requires (percent): C, 51.72; H, 3.47; N, 24.13.

PREPARATION 24

(This intermediate was used in Example XX)

5-(2-carboxyphenoxymethyl)-tetrazole

5 - (2 - (phenylcarbamoyl) - phenoxymethyl)-tetrazole (8.55 g.; 0.029 mole) was dissolved in 20% sodium hydroxide solution (75 ml.) and refluxed for 5 hours. The cooled solution was extracted with ethylacetate (2× 50 ml.) and then carefully acidified to pH 2 with concentrated hydrochloric acid to precipitate a white solid. The solid was filtered, washed with water and dried to give material M.P. 201–202° C. (5.76 g.; 90%).

Crystallisation from acetone:water (1:1 v./v.) gave a white crystalline solid M.P. 204–205° C.

$C_{10}H_8N_4O_3$.—Found (percent): C, 51.77; H, 3.53; N, 25.22. Requires (percent): C, 49.09; H, 3.66; N, 25.45.

The following compounds were prepared from appropriately substituted intermediates by a similar method:

PREPARATION 25

(This compound was used in Preparation 21)

5-(2-carboxy-4-chlorophenoxymethyl)-tetrazole

Prepared from 5-[2-(phenylcarbamoyl)-4-chlorophenoxymethyl]-tetrazole.

White needles from acetone M.P. 210–211° C. $C_9H_7ClN_4O_3$.—Found (percent): C, 42.18; H, 2.95; N, 22.31. Requires (percent): C, 42.45; H, 2.77; N, 22.01.

PREPARATION 26

(This compound was used in Preparation 22)

5-(2-carboxy-4-methylphenoxymethyl)-tetrazole

Prepared from 5-[2-(phenylcarbamoyl) - 4 - methylphenoxymethyl]-tetrazole.

White micro-needles from N,N-dimethyl formamide: water (1:2 v./v.) M.P. 188–189° C. $C_{10}H_{10}N_4O_3$.—Found (percent): C, 51.37; H, 4.15; N, 24.13. Requires (percent): C, 51.28; H, 4.30; N, 23.92.

PREPARATION 27

(This compound was used in Preparation 23)

5-(2-carboxy-5-methoxyphenoxymethyl)-tetrazole

Prepared from 5-[2-(3,4-dichlorophenylcarbomoyl)-5-methoxyphenoxymethyl]-tetrazole.

White crystalline solid from N,N-dimethyl formamide: water (1:2 v./v.) M.P. 220–221° C.

$C_{10}H_{10}N_4O_4$.—Found (percent): C, 48.06; H, 4.08; N, 22.15. Requires (percent): C, 48.00; H, 4.02; N, 22.39.

The analgesic and anti-inflammatory effects of the compounds of general Formula I are shown by the following experiments in comparison with the known drugs aspirin and phenylbutazone.

(1) Phenylbenzoquinone induced writhing in mice.— Mice injected with phenylbenzoquinone display a characteristic writhing syndrome which may be prevented by the prior administration of analgesic and anti-inflammatory drugs. The activity of the compound is expressed as an $ED_{50}$ i.e. that dose which causes a 50% reduction in writhing frequency.

| Compound of Example No.— | $ED_{50}$ (mg./kg. orally) |
|---|---|
| I | 30 |
| II | 20 |
| III | 2.1 |
| IV | 15 |
| V | 15 |
| VI | 12 |
| VII | 13 |
| VIII | 3.4 |
| IX | 35 |
| X | 42 |
| XI | 14 |
| XII | 1.4 |
| XIII | 16 |
| XIV | 23 |
| XV | 36 |
| XVI | 32 |
| XVII | 13.5 |
| XVIII | 23 |
| XIX | 20 |
| XX | 2.7 |
| XXI | 3.2 |
| XXII | 23 |
| Aspirin | 110 |
| Phenylbutazone | 100 |

(2) Carageenin foot oedema in rats.—Carageenin injected in the hind paw of rats causes swelling of the paw which may be measured volumetrically. Anti-inflammatory drugs reduce the degree of swelling. The activity is expressed as a percentage reduction of swelling compared with control animals.

| Compound of Example No. | Dose (mg./kg. orally) | Inhibition of swelling, percent |
|---|---|---|
| I | 50 | 55 |
| II | 50 | 42 |
| III | 10 | 12 |
| III | 20 | 30 |
| III | 40 | 41 |
| III | 80 | 45 |
| IV | 50 | 42 |
| V | 50 | 60 |
| VI | 50 | 28 |
| VII | 50 | 0 |
| VIII | 50 | 55 |
| IX | 50 | 0 |
| X | 50 | 57 |
| XI | 50 | 48 |
| XII | 50 | 44 |
| XIII | 50 | 27 |
| XIV | 50 | 19 |
| XV | 50 | 0 |
| XVI | 50 | 22 |
| XVII | 50 | 36 |
| XVIII | 50 | 20 |
| XIX | 50 | 0 |
| XX | 50 | 31 |
| XXI | 50 | 51 |
| XXII | 50 | 20 |
| Aspirin | 40 | 26 |
| Do | 80 | 31 |
| Do | 160 | 38 |
| Phenylbutazone | 20 | 24 |
| Do | 40 | 26 |
| Do | 80 | 17 |
| Do | 160 | 29 |

The preferred compound of general Formula I for use in the treatment of inflammatory disorders are those in which $R_1$, $R_2$ and $R_3$ each represent hydrogen, halogen or trifluoromethyl and especially 5-[2-(3,4-dichlorophenylcarbamoyl)-phenoxymethyl]-tetrazole and 5-[2-(3-trifluoromethylphenylcarbamoyl) - 4 - chlorophenoxy-methyl]-tetrazole.

We claim:
1. A compound of the formula:

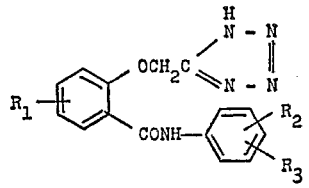

in which $R_1$, $R_2$ and $R_3$ each represents hydrogen, alkyl containing up to six carbon atoms, alkoxy containing up to six carbon atoms, halogen or trifluoromethyl.

2. A compound of claim 1 wherein $R_1$, $R_2$ and $R_3$ each represent hydrogen, halogen or trifluoromethyl.

3. 5-[2-(3,4 - dichlorophenylcarbamoyl) - phenoxymethyl]-tetrazole.

4. 5-[2-(3-trichloromethylphenylcarbamoyl) - 4 - chlorophenoxymethyl]-tetrazole.

References Cited

UNITED STATES PATENTS 2,977,372   3/1961   Finnegan et al. _____ 260—308

ALTON D. ROLLINS, Primary Examiner

U.S. Cl. X.R.

260—239.3 T, 465 D, 559 S; 424—244